United States Patent [19]

Collins

[11] 4,302,963

[45] Dec. 1, 1981

[54] THRUST BEARING WEAR DETECTOR POSITIONER

[75] Inventor: David J. Collins, Scotia, N.Y.

[73] Assignee: General Electric Company, Schenectady, N.Y.

[21] Appl. No.: 149,180

[22] Filed: May 12, 1980

[51] Int. Cl.³ .................... G01M 13/04; G01M 13/00
[52] U.S. Cl. ........................................ 73/1 J; 415/14; 415/118
[58] Field of Search ............... 73/1 J, 1 R, 168, 7, 73/39; 415/14, 118; 188/1 A; 116/208; 340/682, 683

[56] References Cited

U.S. PATENT DOCUMENTS

| | | | |
|---|---|---|---|
| 3,861,818 | 1/1975 | Eggenberger | 415/14 |
| 3,989,408 | 11/1976 | Jaegtnes | 415/118 |
| 4,193,739 | 3/1980 | Lucey | 415/118 |

Primary Examiner—Charles A. Ruehl
Assistant Examiner—Denis E. Corr
Attorney, Agent, or Firm—John F. Ahern; Lawrence D. Cutter

[57] ABSTRACT

A thrust bearing wear detector is mounted on a positioning apparatus which is capable of moving the sensor a predetermined fixed distance toward and away from a rotating collar fixed to a turbine shaft. The positioning apparatus comprises a fixed piston, a movable piston, and a movable casing in which the pistons are slidable. Additionally, bias means, such as springs, position the pistons and the sensor in a predetermined, fixed position until working fluid is delivered under pressure through channels in the fixed piston. The positioning apparatus of the present invention readily facilitates verification of the proper operation of the wear detector.

9 Claims, 1 Drawing Figure

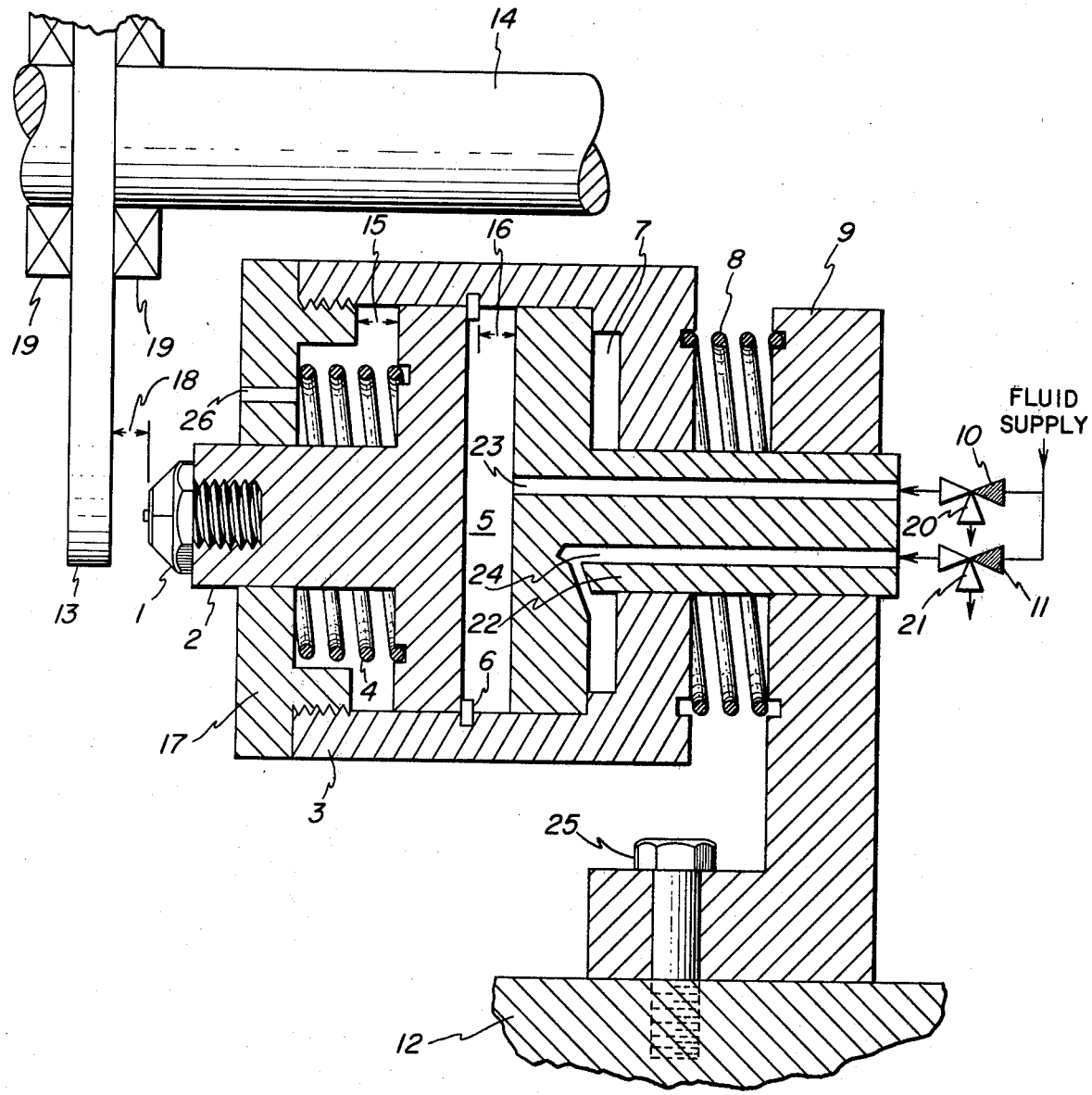

THRUST BEARING WEAR DETECTOR POSITIONER

BACKGROUND OF THE INVENTION

The present invention relates to devices for positioning sensors, particularly proximity sensors used in turbines to detect thrust bearing wear.

Despite their seeming simplicity of operation, turbines employed for the generation of electric power are complex devices comprising a number of subsystems. To achieve efficient conversion of the energy of an elastic fluid, such as steam, into mechanical rotation, specially machined and balanced turbine rotor buckets are positioned between stationary, fluid directing diaphragms. Because the elastic fluid is typically at greatly elevated temperatures, the design of the turbine system must take into account the thermal expansion that occurs during machine startup. Additionally, means must be provided to control axial movements of the rotor shaft. To ensure that the energy bearing elastic fluid is directed onto the buckets from the diaphragms, specially designed brass labyrinth seals are provided between successive bucket stages. If the axial motion of the rotor shaft exceeds certain limits, then damage to the brass seals will likely result. While the seals are replaceable, it is not only expensive to replace them but also requires shutting down of the power plant for a period of time. To protect against axial motion of the turbine rotor assembly, a thrust bearing is typically provided at a position intermediate the low-pressure and high-pressure stages of a turbine. The rotor assembly is typically provided with a collar rotating with the shaft and used as an axial reference for the shaft position. The axial position of the turbine rotor shaft is an important variable in the operation of the power plant since a variation of only a few hundreds of an inch in a device tens of feet long can result in damage to the labyrinth seals. While it is possible to factor into the design tolerances which account for thermal expansion, certain improper modes of boiler operation can result in water injection into the turbine system, thereby creating large axial forces on the turbine rotor. It is these forces that can produce thrust bearing wear, damage to the seals and, ultimately, plant shutdown.

Presently, thrust bearing wear detectors are employed to sense the position of the rotating collar fixed to the thrust bearing assembly. If the position indicated by the sensor exceeds a fixed limit, a cautionary indication is typically provided to the system operator. If the indicated position exceeds still larger limits, an automatic system trip may occur, in which case the automatic control system typically cycles the plant through a shutdown sequence. This is a precautionary measure, which while protective of the equipment, is costly with respect to lost generation capacity. Accordingly, it is of great value to be able to verify the correct operation of the thrust bearing wear detector system at predetermined or random time intervals. Thus, the proximity sensor which is typically an electronic device, must be treated not only for mechanical positioning, but the electrical circuitry used in connection therewith should also be tested to determine that it too is functioning properly. For it must be remembered that the thrust bearing wear detection subsystem is one that will be operated and relied upon for periods of several years and longer without human intervention.

For adequate tests of the proximity sensor it is therefore necessary to be able to move the sensing device toward and away from the thrust bearing collar a fixed, predetermined and precise distance reliably over a period of years.

One form of positioning device for a turbine rotor position sensor is described in U.S. Pat. No. 3,989,408 issued Nov. 2, 1976 to Karl O. Jaegtnes. There is apparently disclosed therein a piston-within-a-piston arrangement for sensor positioning. However, this arrangement is unnecessarily complicated and provides minimal piston areas against which a motive fluid such as air or oil can act. This reduced area therefore requires higher fluid pressures than are necessary. It further appears to necessitate the use of piston seals, failure of which renders the positioning device inoperative for its intended purposes. Moreover, the use of seals coupled with the relatively low area provided for the motive fluid to work against, increases the probability that one or both of the pistons will stick causing failure of the apparatus to perform its verification function. Additionally, the piston-within-a-piston arrangement of Jaegtnes requires a complex fluid channel configuration requiring the conjunction of an outer passage in the casing with an inner passage through the intermediate piston in order to effect a movement of the innermost piston. This structure is necessitated by this piston-within-a-piston arrangement. In addition to the operational problems that result from a seal failure of the Jaegtnes device, the use of seals potentially limits the life of the device by employing a component that is susceptible to wear and to a relatively early failure.

SUMMARY OF THE INVENTION

In accordance with a preferred embodiment of the present invention, an apparatus for positioning a proximity sensor within a turbine housing comprises a first piston fixed with respect to the housing and having first and second fluid chanels therein; it also comprises a movable casing in which the first piston is slidable between stops within the casing, the first piston dividing the interior of the casing into two pressurizable volumes, one of the volumes being in communication with the first fluid channel and the other being in communication with the second fluid channel; it further comprises first bias means tending to urge the casing in a given direction with respect to the fixed piston so as to reduce the first volume and a second piston slidable between two stops within the casing. The second piston, the first piston and the casing define the second volume. And lastly, it comprises a second bias means urging the second piston in a given direction with respect to the casing so as to tend to reduce the second volume. Introduction of a pressurized fluid through either of the fluid channels causes relative movement of the proximity sensor which is preferably positioned on a shank portion of the second piston.

DESCRIPTION OF THE FIGURE

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

The FIGURE is a partial cross-sectional view of a proximity sensor positioner in accordance with one embodiment of the present invention.

DETAILED DESCRIPTION OF THE INVENTION

The basic parts of the present invention are shown in the FIGURE. These include fixed piston 22, movable casing 3 and movable piston 2. Bias springs 4 and 8 are also shown. Disposed through fixed piston 22 are fluid channels 23 and 24. Fluid channel 24, referred to above as a first fluid passage, communicates with first volume 7 defined by casing 3 and fixed piston 22. Also disposed through piston 22 is second fluid passage 23 which is in communication with second volume 5 defined by fixed piston 22, casing 3 and movable piston 2. First bias means, such as spring 8, tends to urge the casing in a direction so as to tend to reduce first volume 7. Second bias means, such as spring 4, urges movable piston 2 relative to casing 3 in a direction so as to tend to reduce second volume 5. Each piston, 22 and 2, typically comprises a head portion which is slidable in the casing 3 and a shank portion. Proximity sensor 1 is affixed to the shank portion of movable piston 2 as shown. While sensor 1 is shown affixed by screw means, any other convenient means may be employed such as adhesives and welds. Additionally, while sensor 1 is described herein as a proximity sensor, other types of sensors such as fluidic sensors and optic sensors, may be employed in conjunction with the present invention. In connection with the use of the present invention as described herein, sensor 1 is positioned a fixed distance 18 from thrust collar 13 which is affixed to rotating shaft 14 in the vicinity of thrust bearings 19. To ensure proper spacing of distance 18, the apparatus of the present invention is fixed to bracket or supporting member 9 which is affixed to the turbine casing 12 as by bolt 25. For convenience casing 3 is provided with a casing cap 17 which, for example, is affixed to the casing by screw means as shown; however, attachment of cap 17 to the casing 3 may also be effected by separate bolt fasteners. The casing cap 17 assists in the alignment of piston 2 by having the shank of this piston disposed therethrough. Casing cap 17 also preferably contains vent 26 so as to permit the easy movement of piston 2.

Within casing 3 itself, there are also preferably disposed means for stopping the travel of the pistons relative to the casing. For example, casing cap 3 may be configured as shown to provide a stop for the travel of piston 2 within the casing as shown. The distance between this stop and the left-most surface of the head of piston 2 defines distance 15, which is the extent of travel of piston 2 relative to the casing 3. A second stop 6 limits the travel of piston 2 in the direction which tends to reduce volume 5. Stop 6 may be provided, for example, by a snap ring disposed within a circumferential channel of the casing 3 as shown. Stop 6 may also operate as a stop for the motion of casing 3 with respect to fixed piston 22. However, if desired, separate stops comprising different rings could be provided. As shown in the FIGURE, a last stop is provided by the casing configuration itself so as to prevent further travel of the casing to the left. Also shown in the FIGURE, stop 6 defines distance 16 between stop 6 and the left-most surface of the head of fixed piston 22. This distance 16 represents the extent of travel of the casing 3 with respect to the fixed piston 22.

A pressurized fluid supply is provided to channels 23 and 24 through valves 10 and 11, respectively, each of these valves also including drains 20 and 21, respectively.

The operation of the present invention is now described. The invention is initially installed within turbine casing 12 so that the distance 18 between thrust collar 13 and sensing element 1 is greater than the distance 15 between piston 2 and casing 3. Distance 18 is also large enough to accommodate the normal float between thrust bearings 19 so that when sensing element 1 is extended toward thrust collar 13, contact is not possible. Once installed, this is referred to as the normal operating position. To position sensing element 1 toward thrust collar 13, solenoid valve 10 is energized admitting operating fluid into volume 5 through piston 22, thereby compressing bias means 4 with piston 2 and moving sensing element 1 toward the thrust collar 13 a distance equal to gap 15. When solenoid 10 is de-energized bias means 4 moves piston 2 back to its normal operating position against ring 6 and the operating fluid thence through drain 20. To position sensing element 1 away from thrust collar 13, solenoid valve 11 is energized, admitting operating fluid through channel 24 in fixed piston 22 to volume 7. Since piston 22 is firmly attached to bracket 9, the casing 3, along with sensing element 1, piston 2, bias means 4, and ring 6, moves away from thrust collar 13 a distance equal to gap 16 while compressing bias means 8. When solenoid valve 11 is de-energized, bias means 8 moves casing 3, sensing element 1, piston 2, bias means 4 and ring 6 back toward the normal operating position and the operating fluid is vented through drain 21. In this manner, the sensing element is moved toward and away from the thrust collar reference 13 through fixed predetermined distances and returned to a normal operating position.

While any suitable fluid may be employed as a working fluid to effect movement of the piston and casing, air is a preferred fluid for several reasons. It is not subject to problem of overheating; it is readily available; and it may be readily vented to the atmosphere without the concerns associated with liquid fluids. Furthermore, any system leaks which might develop over extended periods of time are of minimal consequence.

Additionally, it should be noted that the preferred embodiment of the present invention, especially when employed for its intended purposes within the casing of a steam turbine, is approximately three inches in diameter. Thus, while the preferred embodiment of the present invention is cylindrical, other cross sections are equally easily employed, though probably not as easily manufactured. Because the diameter of the present invention is only approximately three inches, it is therefore readily seen from the FIGURE that the thrust collar 13 and the rotor shaft 14 are not shown to scale. This scale difference is merely for illustrative purposes so that the operation of the present invention may be more readily perceived from the FIGURE.

It is also seen from the FIGURE that the configuration of the present invention provides a relatively large piston head area. This increased area operates in accord with well-known hydraulic principles to produce much larger forces of motion than if only a small annular portion of the piston head were employed as an area against which a pressurized fluid acts. Accordingly, this greater force significantly increases the force to friction ratio and decreases the chances that either of the two movable portions of the present invention will stick or jam. Even if some leakage of the fluid were to occur between the pistons and the casing, sufficient force margin still exists to operate the device.

From the above it is appreciated that the apparatus of the present invention provides an effective and reliable means to position a given object toward and away from a reference position by fixed predetermined distances. It is also seen that the positioner of the present invention is operable without seals and provides large piston areas against which a pressurized working fluid can operate with minimal probability of sticking or jamming. Moreover, the present invention requires no complex arrangement of coincident fluid channels. All of the fluid channels of the present invention are conveniently provided through a single fixed piston.

While the invention has been described in detail herein in accord with certain preferred embodiments thereof, many modifications and changes therein may be effected by those skilled in the art. Accordingly, it is intended by the appended claims to cover all such modifications and changes which fall within the true spirit and scope of the invention.

The invention claimed is:

1. An apparatus for positioning a sensor with respect to a movable component, such as a rotating turbine, within housing, said apparatus comprising:
   a first piston fixed with respect to said housing, said first piston having first and second fluid channels therein;
   a movable casing in which said first piston is slidable between two stops within said casing, said first piston dividing the interior of said casing into two pressurizable volumes, a first volume in communication with said first fluid channel and a second volume in communication with said second fluid channel;
   first bias means urging said casing in a given direction with respect to said first piston, said direction tending to reduce said first volume;
   a second piston slidable between two stops within said casing, said second piston, said first piston and said casing defining said second volume; and
   second bias means urging said second piston in a given direction with respect to said casing, said direction tending to reduce said second volume.

2. The positioning apparatus of claim 1 in which said pistons are coaxial.

3. The positioning apparatus of claim 1 in which said first bias means comprises a spring disposed between said casing and said housing.

4. The positioning apparatus of claim 1 in which second bias means comprises a spring disposed between said casing and said second piston.

5. The positioning apparatus of claim 1 further comprising means to selectively supply a working fluid to said first and second fluid channels.

6. The positioning apparatus of claim 5 in which said fluid is air.

7. The positioning apparatus of claim 1 in which said sensor is affixed to a shank portion of said second piston.

8. The positioning apparatus of claim 1 in which said first piston has shank and head portions with said first fluid channel being disposed through said shank and head portions and with said second fluid channel being disposed only through said shank portion.

9. The positioning apparatus in claim 1 in which said movable casing possesses stops therein for limiting the motion of travel of the pistons relative to the casing.

* * * * *